(12) United States Patent
Liu et al.

(10) Patent No.: US 10,581,233 B2
(45) Date of Patent: Mar. 3, 2020

(54) METHOD OF WINDING FLEXIBLE CABLE, CARRYING EQUIPMENT AND GIMBAL

(71) Applicant: ZEROTECH (SHENZHEN) INTELLIGENCE ROBOT CO., LTD., Shenzhen (CN)

(72) Inventors: Gengpeng Liu, Beijing (CN); Hongtao Sun, Beijing (CN)

(73) Assignee: ZEROTECH (SHENZHEN) INTELLIGENCE ROBOT CO., LTD., Shenzhen (CN)

( * ) Notice: Subject to any disclaimer, the term of this patent is extended or adjusted under 35 U.S.C. 154(b) by 512 days.

(21) Appl. No.: 15/333,794

(22) Filed: Oct. 25, 2016

(65) Prior Publication Data

US 2017/0338639 A1    Nov. 23, 2017

(30) Foreign Application Priority Data

May 17, 2016    (CN) .......................... 2016 1 0327643

(51) Int. Cl.
*H02G 11/00* (2006.01)
*H02G 11/02* (2006.01)
*H04N 5/225* (2006.01)
*H04N 5/232* (2006.01)

(52) U.S. Cl.
CPC ........... *H02G 11/02* (2013.01); *H04N 5/2251* (2013.01); *H04N 5/2253* (2013.01); *H04N 5/23203* (2013.01)

(58) Field of Classification Search
CPC ...... H02G 11/00; H02G 11/02; H02G 11/006; H04N 5/2252; H04N 5/2253; H04N 5/23203; H04N 5/23296; H05K 1/02; G03B 17/56; G03B 17/561; F16M 11/123; F16M 11/18; F16M 13/02; F16M 11/08; F16M 11/12; F16M 11/128; F16M 11/2021; F16M 11/2064
USPC .... 174/68.1, 68.3, 72 A, 72 TR, 75 F, 117 F, 174/117 FF, 135; 396/419, 427
See application file for complete search history.

(56) References Cited

U.S. PATENT DOCUMENTS 6,459,043 B1 * 10/2002 Dodsworth .............. G11B 5/40
174/254
6,628,338 B1 * 9/2003 Elberbaum ........ G08B 13/1963
348/373
7,905,463 B2 * 3/2011 Burnham ............. F16M 11/123
248/177.1
8,253,021 B2 * 8/2012 Adachi .................... H02G 3/26
174/135

(Continued)

FOREIGN PATENT DOCUMENTS

CN    204802098 U    11/2015
JP    2000-200993 A    7/2000
JP    2006-93461 A    4/2006

*Primary Examiner* — Angel R Estrada
(74) *Attorney, Agent, or Firm* — Scully Scott Murphy & Presser

(57) ABSTRACT

A method of winding a flexible cable, a carrying equipment and a gimbal are provided. The method is used for electrical connection in the carrying equipment, and includes winding a multilayer flexible cable provided in layered stack on a carrier device to form a winding structure, and the winding structure includes at least one force offsetting unit including a first bending part and a second bending part bent in opposite directions.

20 Claims, 10 Drawing Sheets

(56) References Cited

U.S. PATENT DOCUMENTS

| | | | |
|---|---|---|---|
| 8,395,047 B2* | 3/2013 | Adachi | B60L 3/0007 |
| | | | 174/74 R |
| 9,663,245 B2* | 5/2017 | Zhao | B64D 47/08 |
| 9,749,544 B2* | 8/2017 | Wang | G03B 17/561 |
| 2012/0008900 A1* | 1/2012 | Schneider | G02B 6/3608 |
| | | | 385/50 |
| 2017/0336019 A1* | 11/2017 | Liu | B65H 75/4486 |

* cited by examiner

METHOD OF WINDING FLEXIBLE CABLE, CARRYING EQUIPMENT AND GIMBAL

TECHNICAL FIELD

The embodiments of the present disclosure relate to a method of winding a flexible cable, a carrying equipment and a gimbal.

BACKGROUND

Flexible printed circuits (FPCs) are advantageous due to characteristics such as high wiring density, light weight, and thin thickness, and have been mainly applied in mobile phones, laptop computers, palm computers, digital cameras, liquid crystal display modules, gimbals, and many other products. Flexible Flat Cables (FFCs) belong to a new type of cable for transferring data and electrical power for example, and have the advantages such as flexibility, thin thickness, easy connection, and so on.

With reference to FIG. 1 and FIG. 2, in an existing gimbal, FPCs are usually employed to electrically connect various components (e.g., a motor, an inertial measurement unit (IMU), a camera (imaging module), a PCB board). However, as gimbals are gradually miniaturized while the transmission lines are continuously increased, monolayer FPCs have become unable to meet the data transmission requirements, and thus multilayer FPCs are widely used a multilayer FPC may include a plurality of monolayer FPCs which are stacked with each other (stacked FPC), or a plurality of monolayer FPCs which are stacked with each other are bonded together by adhesive to form an integrated FPC for use. However, when the above integrated FPC or stacked FPC is used in a gimbal for electrical connection, upon a motor in the gimbal being rotated in forward and reverse directions, the FPC that is wound on a rotation shaft of the motor in advance will be wound or unwound. As for an integrated FPC, as the plurality of monolayer FPCs stacked with each other therein are bonded together by adhesive, it has a relatively larger thickness and a relatively bigger hardness than a stacked FPC, and is not easily wound or unwound when the rotation shaft of the motor is rotated. As for a stacked FPC, during the motor is rotated, local accumulation of FPC may be caused because the inner sub-layer FPC and the outer sub-layer FPC are rotated by different distance, and the heaped portion in the stacked FPC brings unstable resistance to the torque of the motor so that the requirements on the torque of the motor is in fluctuation, and thus the rotation of the motor is caused to be unstable and the whole driving precision of the gimbal is degraded.

SUMMARY

An embodiment of the present disclosure provides a method of winding a flexible cable for electric connection of a carrier device, the flexible cable comprises a multilayer flexible cable, and the method includes winding the multilayer flexible cable provided in layered stack on the carrier device to form at least one winding structure, and the winding structure includes at least one force offsetting unit including a first bending part and a second bending part which are bent in opposite directions.

Another embodiment of the present disclosure provides a carrying device including a carrier device and a multilayer flexible cable provided in layered stack, the multilayer flexible cable is wound on the carrier device to form at least one winding structure, and the winding structure includes at least one force offsetting unit including a first bending unit and a second bending unit which are bent in opposite directions.

Still another embodiment of the present disclosure provides a gimbal, the gimbal includes at least one motor and a multilayer flexible cable provided in layered stack, the multilayer flexible cable is wound on the at least one motor and form at least one winding structure, the winding structure includes at least one force offsetting unit including a first bending part and a second bending part, and the first bending part and the second bending part are bent in opposite directions.

DESCRIPTION OF ACCOMPANYING DRAWINGS

In order to more clearly describe the technical solution of the embodiments of the present disclosure, the accompanying drawings for the embodiments will be briefly described, it is obvious that the accompanying drawings in the following description only illustrate some embodiments of the present disclosure, but not are intended to limit the present disclosure. To the person skilled in the art, other relevant accompanying drawings can also be conceived according to these drawings without any creative labor.

DETAILED DESCRIPTION

Figure 1:
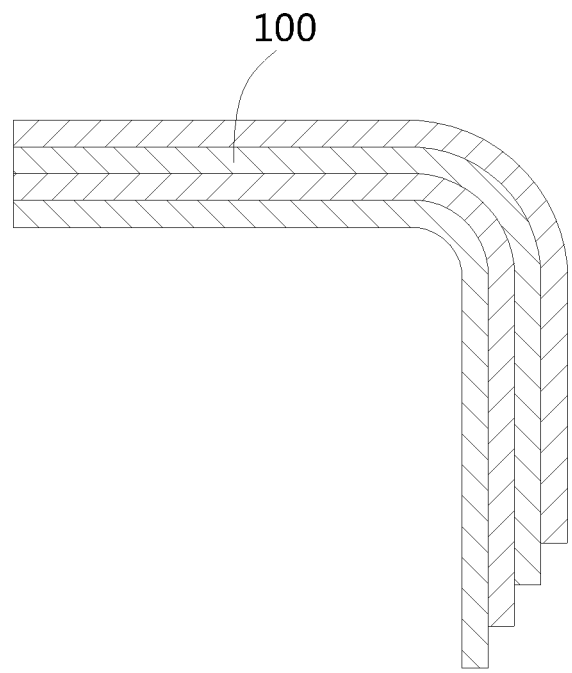
FIG. 1 is a schematic structure diagram of a multilayer FPC, the FPC sub-layers of which have different lengths.
Figure 2:
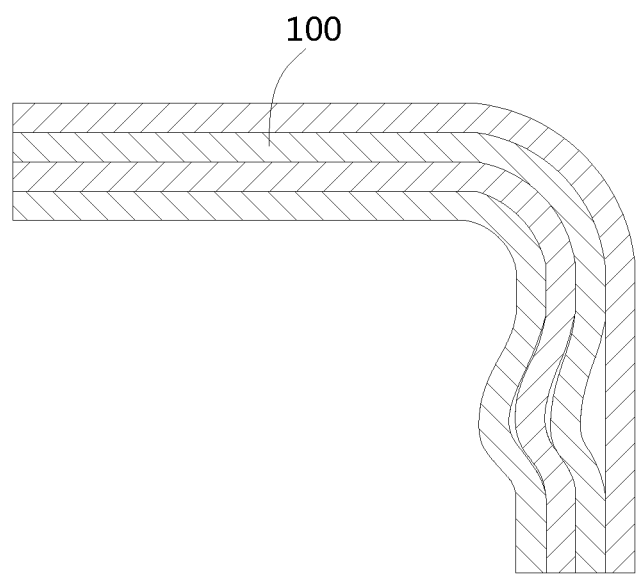
FIG. 2 is a schematic diagram illustrating the structure in which resistance is generated when the multilayer FPC is acted due to rotation.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Generally, the components of the embodiments of the present disclosure as illustrated and described in the accompanying drawings here can be arranged and designed in various configurations.

Thus, the detail description on the embodiments of the present disclosure provided in the accompanying drawings is not intended to limit the scope of the claimed disclosure, but only indicate the selective embodiments of the present disclosure. Based on the described embodiments herein, those skilled in the art can obtain other embodiment(s), without any inventive work, which should be within the scope of the disclosure.

It is to be noted that similar symbols and letters are used to indicate the similar items throughout the drawings, and therefore, once an item has been defined in one drawing, then the item is not needed to be further defined and explained in the subsequent drawings.

It is appreciated that the location or position relationship indicated by the terms "upper", "lower", "inner", "outer", or the like, as used herein, is based on the location or position relationship as illustrated in the accompanying drawings, or the location or position relationship normally placed when the inventive product is being used, or the location or position relationship conventionally understood by the person skilled in the art, servers merely for the purpose of facilitating to described the present disclosure and simplify the description, but does not indicate or imply the indicated device or member must have the specific location or position, is constructed and operated in a specific location, and therefore, should not be construed as limitation on the present disclosure.

In addition, the terms "first", "second", "third", and so on, as used herein, merely serve for distinguishing, but should not be understood as indicating or implying relative significance.

In the description of the present disclosure, it is also to be noted that unless otherwise prescribed or defined explicitly, the terms "provide", "connect", should be understood in their broad sense, for example, it can be a fixedly connection, and also can be a detachable connection or integral connection, can be a mechanical connection or an electric connection, can be a direct connection or a indirect connection via a intervene medium, and also can be communication between inner portions of two members. The specific meaning of the above terms in the present disclosure can be understood by those skilled in the art according to the specific situation.

In this disclosure, FPC (flexible printed circuit) cable and FFC (flexible flat cable) are specific examples of flexible cable. Hereinafter, FPC cable is taken as an example for illustration, but obviously the disclosure is not limited to FPC cable and is applicable to FFC as well. Moreover, when an FFC is put in usage, this FFC can be connected to a corresponding PCB, FPC or the like by a connector to establish electrical connection.

One embodiment of the present disclosure provides a method of winding a flexible cable, which enables internal force produced at inner sides of a bent multilayer FPC to be offset, cancelled or alleviated, resistance acted on the multilayer FPC upon its pursuit movement to be reduced, stability of the carrier device to become stronger, and movement precision of a carrier device to be enhanced.

Another embodiment of the present disclosure provides a carrying equipment, which enables the stability of the carrier device thereof to become stronger and movement precision of the carrier device to be enhanced.

Still another embodiment of the present disclosure provides a gimbal, which does not cause the multilayer FPC to be wound in a disorder manner when the gimbal is in rotation, has a well-defined overall structure, also can enable internal force generated at inner sides of the bent multilayer FPC to be offset, cancelled or alleviated, driving precision of the gimbal to be effectively improved, resistance on the multilayer FPC upon pursuit movement is reduced, and makes the stability of the gimbal to become stronger.

First Embodiment

Figure 3:
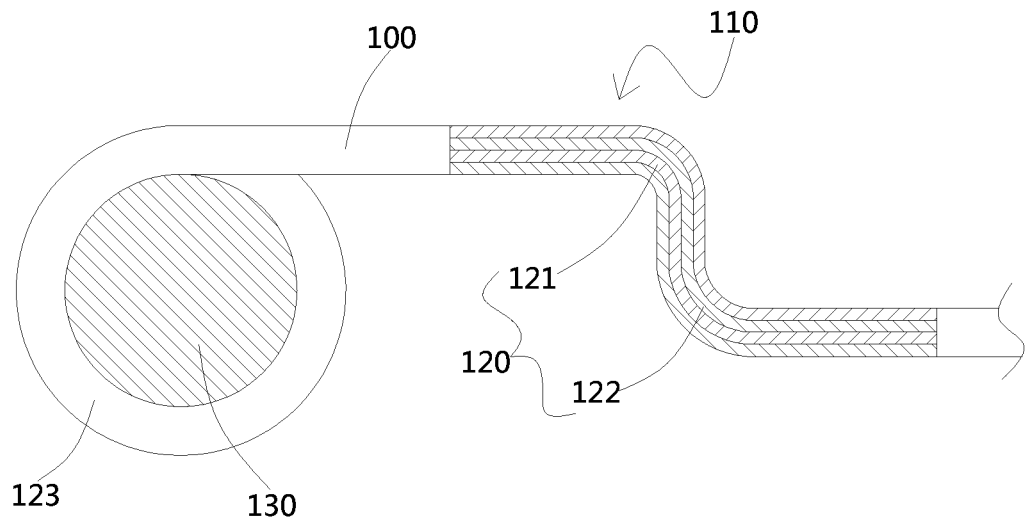
FIG. 3 is a schematic structure diagram illustrating a winding structure obtained from a method of winding a flexible cable provide by a first embodiment of the present disclosure.

With reference to FIG. 3, the present embodiment provides a method of winding a flexible cable for electrical connection of a carrier device 130. The carrier device 130, for example, may carry an FPC cable on its external surface, and the FPC cable is connected with the carrier device 130. When the carrier device 130 is driven to move (e.g., rotation, translation, and so on), the FPC cable connected therewith will be brought to follow the movement of the carrier device. The carrier device 130 may be a driving device including a single motor, a motor group constructed from a plurality of motors, or the like.

Hereinafter, the method of winding a flexible cable provided by the present embodiment will be schematically described in the context of the carrier device 130 including a single motor.

The method of winding a flexible cable can be conducted as follows. A multilayer FPC 100 constructed in layered stack is provided and used, and the multilayer FPC 100 is wound on a motor as an example of the carrier device to form a winding structure 110. The winding structure 110 includes at least one force offsetting unit 120, the force offsetting unit 120 includes a first bending part 121, a second bending part 122 and a transition part therebetween, and the first bending part 121 and the second bending part 122 are bent in opposite directions. The winding structure 110 includes a connection unit 123 wound on a rotation shaft (rotor) of the motor.

When the multilayer FPC 100 is used to form a winding structure, it can be bent towards one side thereof to obtain the first bending part 121, and then are bent back towards a direction opposite to the previous bending direction to obtain the second bending part 122, thus the force offsetting unit 120 is obtained from the first bending part 121 and the second bending part 122.

In the present embodiment, for example, the multilayer FPC 100 is in an elongate strip shape, both ends thereof are respectively connected with two members, and the portion between the two ends is wound on the motor as the example of the carrying equipment. Therefore, when the motor is rotated, the multilayer FPC 100 will be rotated to follow the rotation of the motor.

When the multilayer FPC 100 is wound, various kinds of force offsetting units 120 can be obtained according to the bending pattern and/or the running direction of the multilayer FPC 100.

Figure 4:
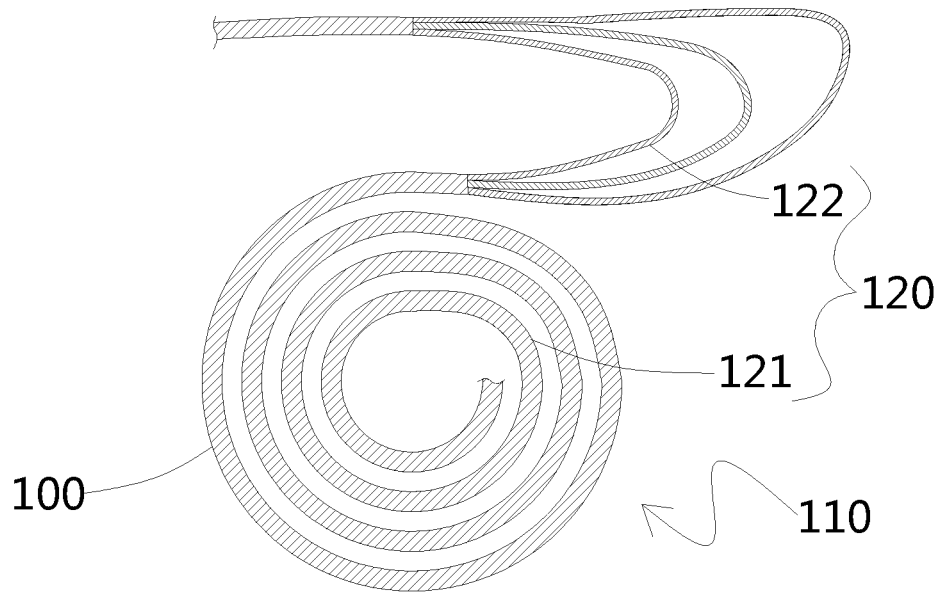
FIG. 4 is a schematic diagram illustrating a first bending part and a second bending part that in combination form a spiral reverse shape structure and are obtained by the method of winding a flexible cable provided by the first embodiment of the present disclosure.

For example, in another example, with reference to FIG. 4, the sub-layers of a multilayer FPC 100 is unidirectionally (clockwise in drawings) disk-like wound from inside to outside layer by layer, to obtain the first bending part 121, and when the FPC 100 is wound to the outmost layer, the multilayer FPC 100 is bent towards a direction (anticlockwise in drawings) opposite to the unidirectionally disk-like winding direction, to obtain the second bending part 122. In this way, the first bending 121 and the second bending part 122 collectively form a spiral reverse shape structure.

In addition, with reference to FIG. 4, for the spiral reverse shape structure as illustrated, because the multilayer FPC 100 is unidirectionally disk-like wound in its inner layers, the stack length of every FPC sub-layer in the multilayer FPC 100 is increased as the sequence number of the sub-layers from the inside to the outside is increased, thus a length compensation can be obtained at the second bending part 122. The sub-layers of the multilayer FPC 100 are separated from each other at the second bending part 122, and the outmost layer of FPC is bent at the largest amplitude, and the bending amplitude of each sub-layer of the multilayer FPC from outside to inside is gradually decreased, so that, for example, the compensation length for each sub-layer of the multilayer FPC is larger than the stack length this sub-layer. A method for providing length compensation, for example, is as follows: a fold mark is formed in advance in the outmost layer at the second bending part 122, after the multilayer FPC is bent at the fold mark, a configuration in which many sub-layer are separately folded (only three layers are illustrated in drawings) and the bending amplitudes thereof are decreased from outside to inside can be naturally formed. By virtue of length compensation, it is possible to compensate for the length by which the inner unidirectionally disk-like wound sub-layer is stacked and the multilayer FPC 100 can maintain the configuration in which the sub-layers are separately bent and the bending amplitudes thereof is decreased from outside to inside in a nature state.

Figure 5:
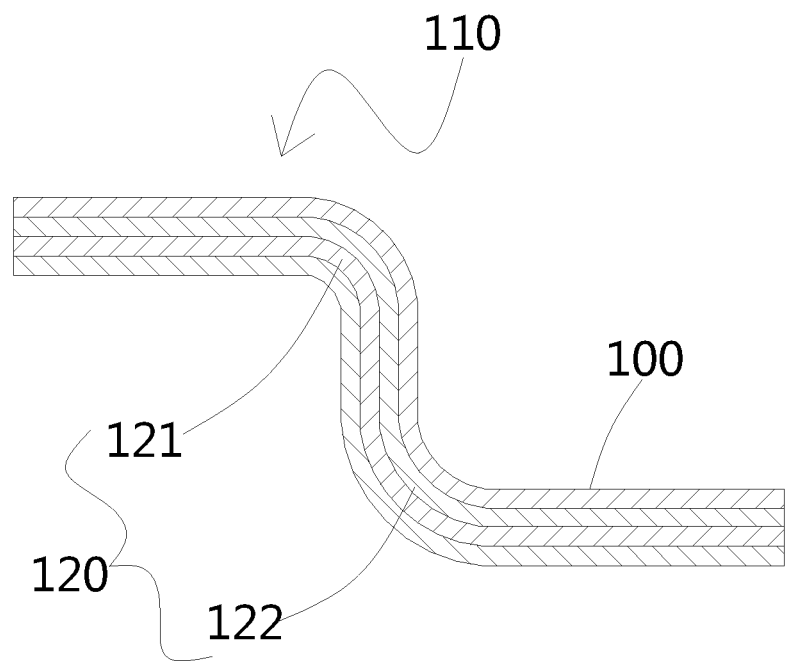
FIG. 5 is a schematic diagram illustrating a first bending part and a second bending part that in combination form an S shape structure and are obtained by the method of winding a flexible cable provided by the first embodiment of the present disclosure.

For example, with reference to FIG. 5, the multilayer FPC 100 is extended in an arc line or a straight line, bent towards a side thereof to obtain a first arcuate bending part 121, and then the multiplayer FPC 100 is extended in an arc line or a straight line, and bent towards another side again to obtain a second arcuate bending part 122. Thus, the first bending part 121 and the second bending part 122 form a substantially S shape structure, the values of the curvature of the first bending part 121 and the second bending part are not limited to what are illustrated in the accompanying drawings, and bigger or smaller curvature is applicable.

Figure 6:
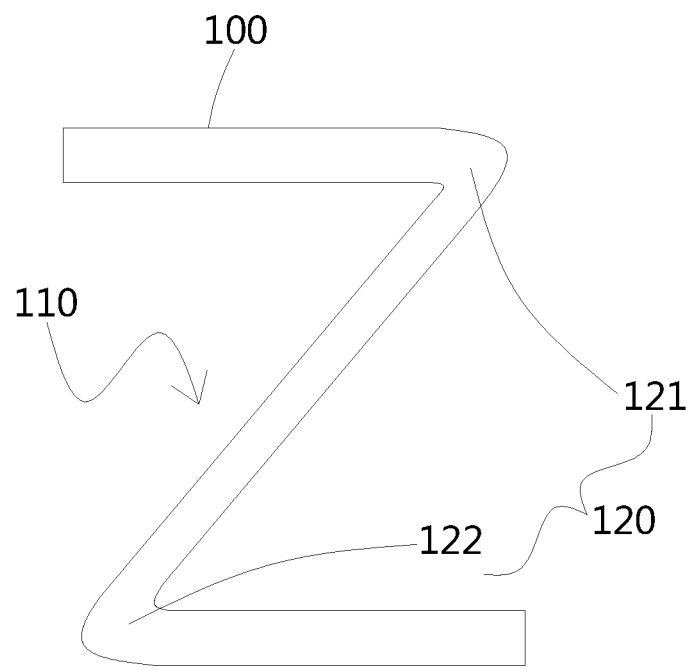
FIG. 6 is a schematic diagram illustrating a first bending part and a second bending part that in combination form a Z shape structure and are obtained by the method of winding a flexible cable provided by the first embodiment of the present disclosure.

For example, with reference to FIG. 6, the multilayer FPC 100 is extended in a straight line, bent towards a side thereof to obtain the first arcuate bending part 121, and then the portion of the multiplayer FPC 100 which has been extended is further extended in an oblique straight line, and the extended portion of the multilayer FPC 100 is further bent towards another side thereof to obtain the second arcuate bending part 122. Thus, the first bending part 121 and the second bending part 122 in combination form a substantially Z shape structure.

Figure 7:
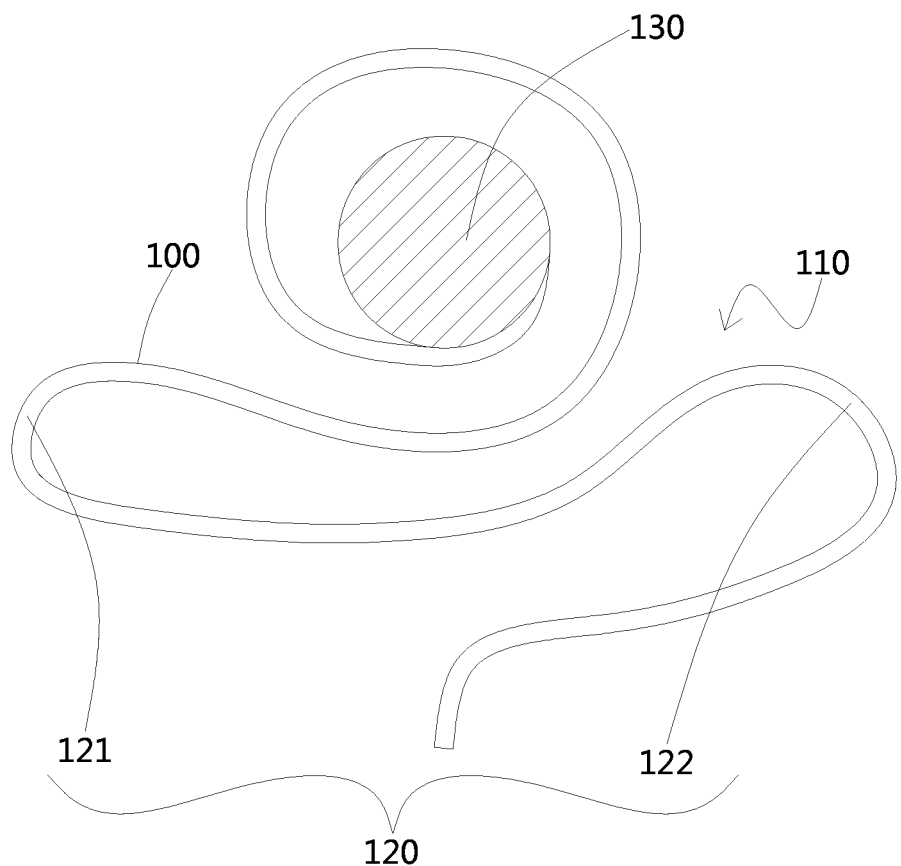
FIG. 7 is a schematic diagram illustrating a first bending part and a second bending part that in combination form a butterfly shape structure and are obtained by the method of winding a flexible cable provided by the first embodiment of the present disclosure.

For example, with reference to FIG. 7, the multilayer FPC 100 is wound on the motor as the example of the carrier device 130, one end thereof is reeled out of the motor, and then is extended to a side (left side in FIG. 7) of the motor in an arc line; the portion of the multilayer FPC 100 extended outside of the motor is bent towards one side (right side in FIG. 7) to obtain the first arcuate bending part 121, then the extended portion of the multilayer FPC 100 further runs in an arc line to another side (left side in FIG. 7) of the motor, and the extended portion of the multilayer FPC 100 is further bent towards another side (right side in FIG. 7) to form the second bending part 122 in an arc shape. Thus, the first bending part 121 and the second bending part 122 form a substantially butterfly shape structure.

Of course, the shape formed by the first bending part 121 and the second bending part 122 is not limited to the spiral reverse shape, the S shape, the Z shape and the butterfly shape as above mentioned, and other shape can also be realized depending on the winding requirement.

With reference to FIG. 5 again, the principle to offset or cancel the internal force will be described by way of the example that the first bending part 121 and the second bending part 122 form into the S shape.

When the multilayer FPC 100 is fixed at both ends thereof, a bulge occurred at the first bending part 122 can be offset, cancelled or alleviated at the second bending part 122; similarly, a bulge occurred at the second bending part 122 can be offset, cancelled or alleviated at the first bending part 121; therefore, there is no such a situation that the stacked sub-layers induce tension to an adjacent structure. Furthermore, in the multilayer FPC 100, the FPC sub-layer located at the outer side of the bulge at the first bending part 121 will be extended to the inner side of the bulge at the second bending part 122, thus force offsetting situation can be occurred to each sub-layer, and thus the force acted on each sub-layer of the multilayer FPC 100 will become better balanced.

Therefore, with reference to FIG. 3, in the method of winding a flexible cable provided by the present embodiment, the winding structure 110 is formed by winding the multilayer FPC 100 on the carrier device 130, and further at least one force offsetting unit 120 can be formed in winding. When the carrier device 130 is moved, with the first bending part 121 and the second bending part 122 being bent to opposite directions, the internal force generated at an inner side of the bent multilayer FPC 100 can be offset or cancelled, so that the posture of the multilayer FPC 100 can be maintained at a nature state, thus the connection position of the multilayer FPC 100 with the carrier device 130 does not suffer from any force, no additional torque is acted on the carrier device 130, and therefore, the carrier device 130 possesses stronger stability, and the movement precision of the carrier device 130 can also be improved.

Second Embodiment

The present embodiment provides a method of winding a flexible cable, in which the method of winding a flexible cable provided by the first embodiment is further applied in e.g. a three-axis driven carrier device 130. In the present embodiment, the structure of the carrier device 130 can refer to the structure of the gimbal provided by the fourth embodiment but is not limited to that structure.

With reference to FIG. 9 to FIG. 15, the carrier device 130 includes a first driver (referring to a pitch motor 610 in drawings), a second driver (referring to a yaw motor 620 in drawings), a third driver (referring to a roll motor 630 in drawings), an electronic component (referring to a camera module 640 in drawings), a first cable passage structure 650 and a second cable passage structure 660. For example, the first cable passage structure 650 and the second cable passage structure 660 are configured for wiring between the drivers or between one of the drivers and the electronic component.

It should be appreciated that the first driver, the second driver and the third driver can be motors or other driving devices. For example, the axes of the first driver, the second driver and the third driver may be orthogonal to one another. For example, the first driver is connected with the second driver, the second driver is connected with the third driver, and the first driver is connected with the electronic component.

A multilayer FPC 100 is wound on the carrier device 130 to form winding structures, and the formed winding structures include a first winding structure 200, a second winding structure 300 and a third winding structure 400.

Figure 11:
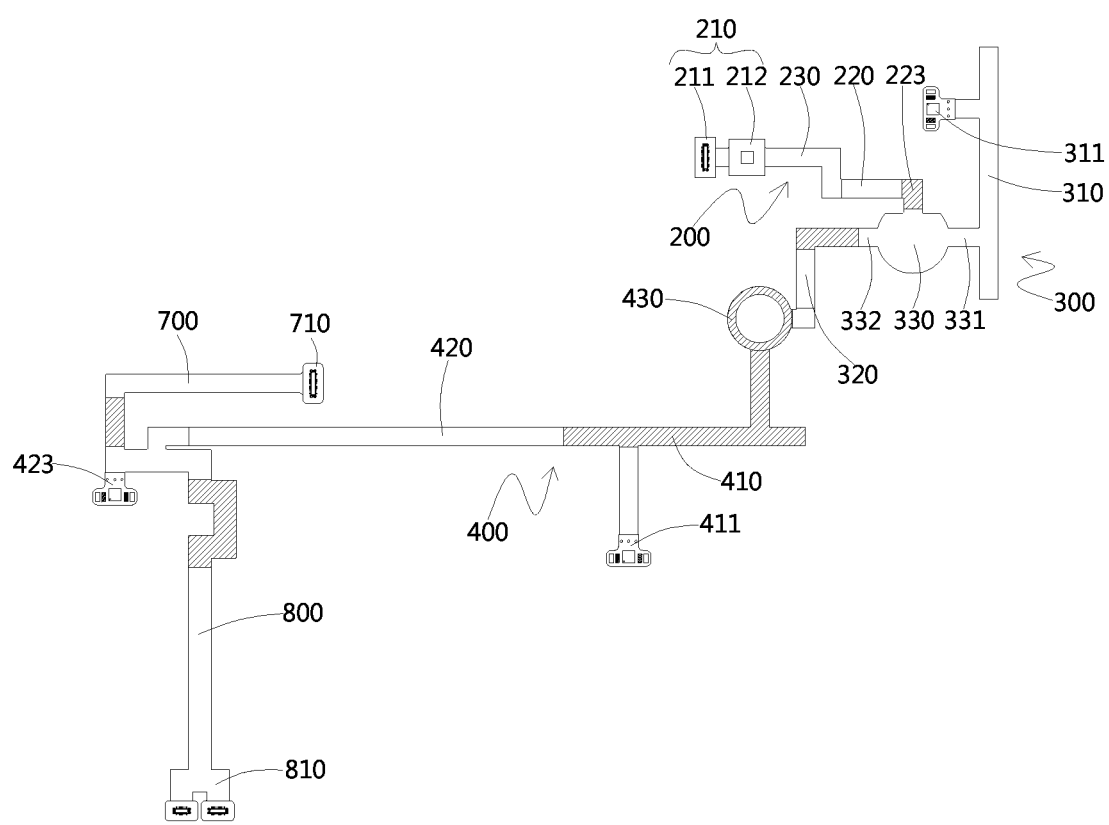
FIG. 11 is a plane expanded structural diagram illustrating a multilayer FPC of the gimbal provided by the fourth embodiment of the present disclosure.
Figure 12:
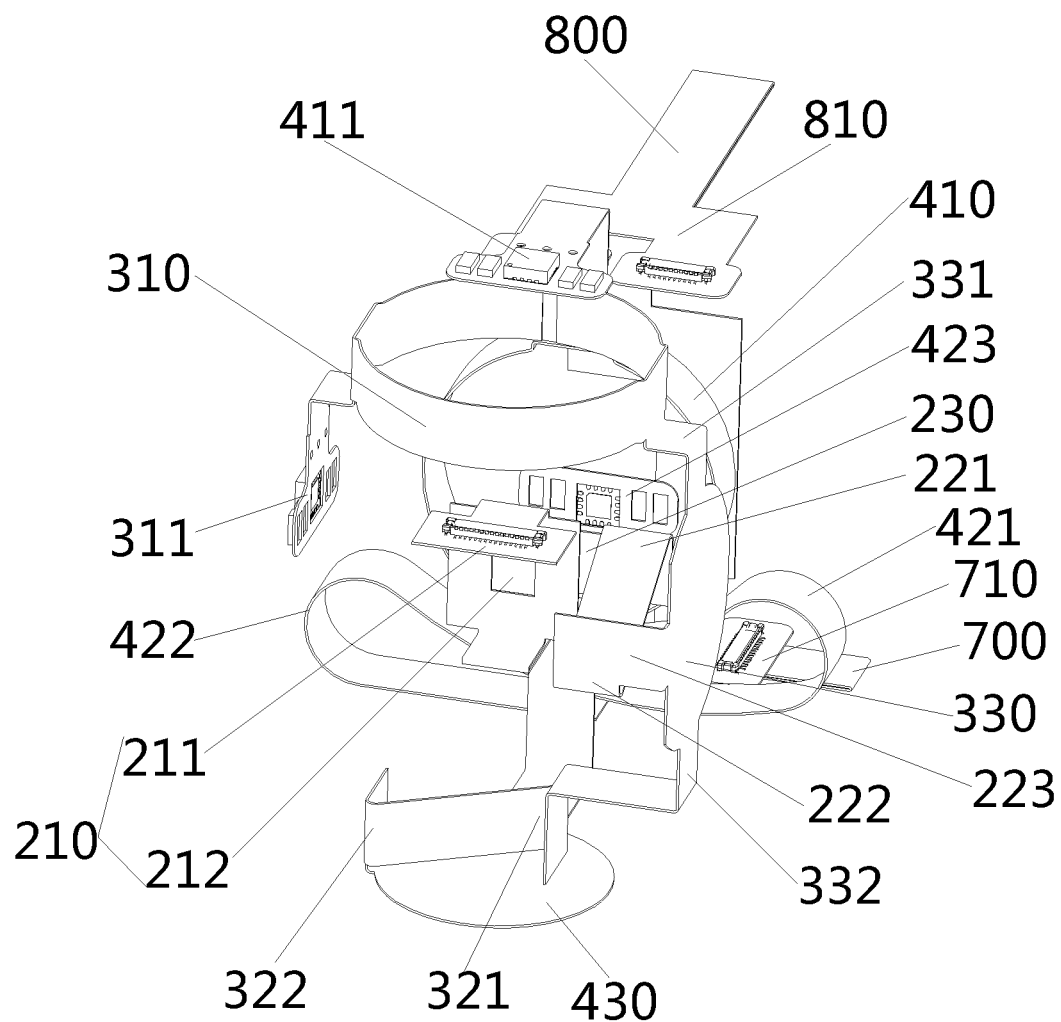
FIG. 12 is a schematic structure diagram illustrating a winding structure of the multilayer FPC in the gimbal provided by the fourth embodiment of the present disclosure from a front angle of view.
Figure 13:
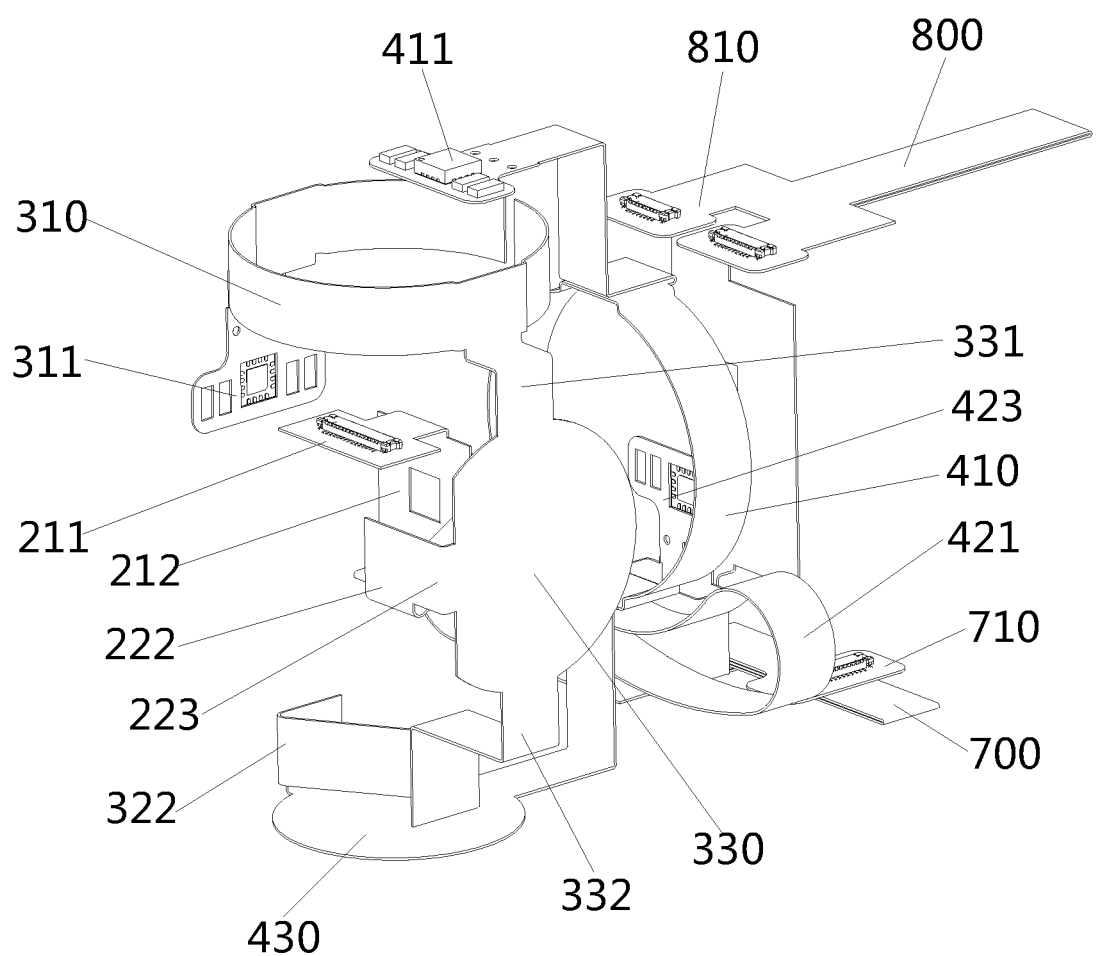
FIG. 13 is a schematic structure diagram illustrating the winding structure of the multilayer FPC in the gimbal provided by the fourth embodiment of the present disclosure from a rear side angle of view.
Figure 14:
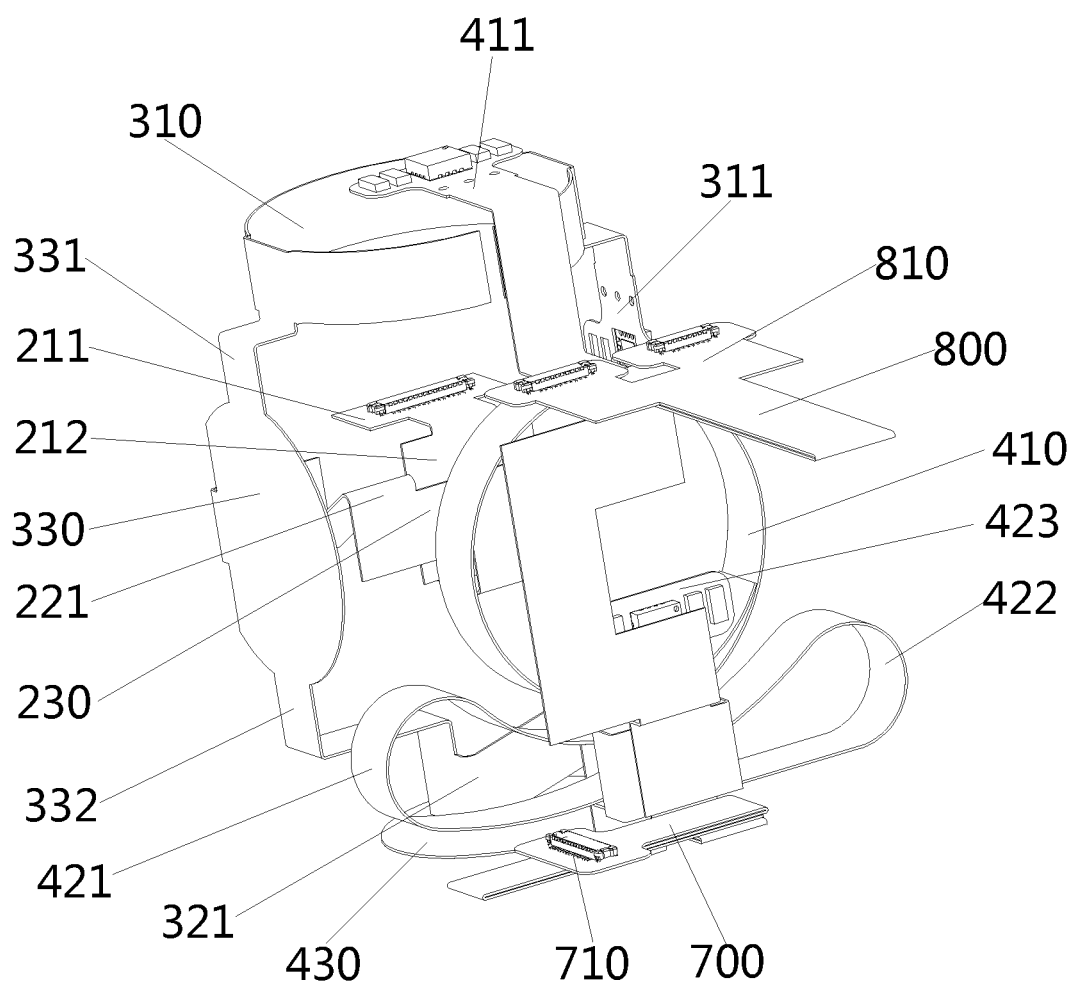
FIG. 14 is a schematic structure diagram illustrating the winding structure of the multilayer FPC in a gimbal provided by the fourth embodiment of the present disclosure from a rear angle of view.
Figure 15:
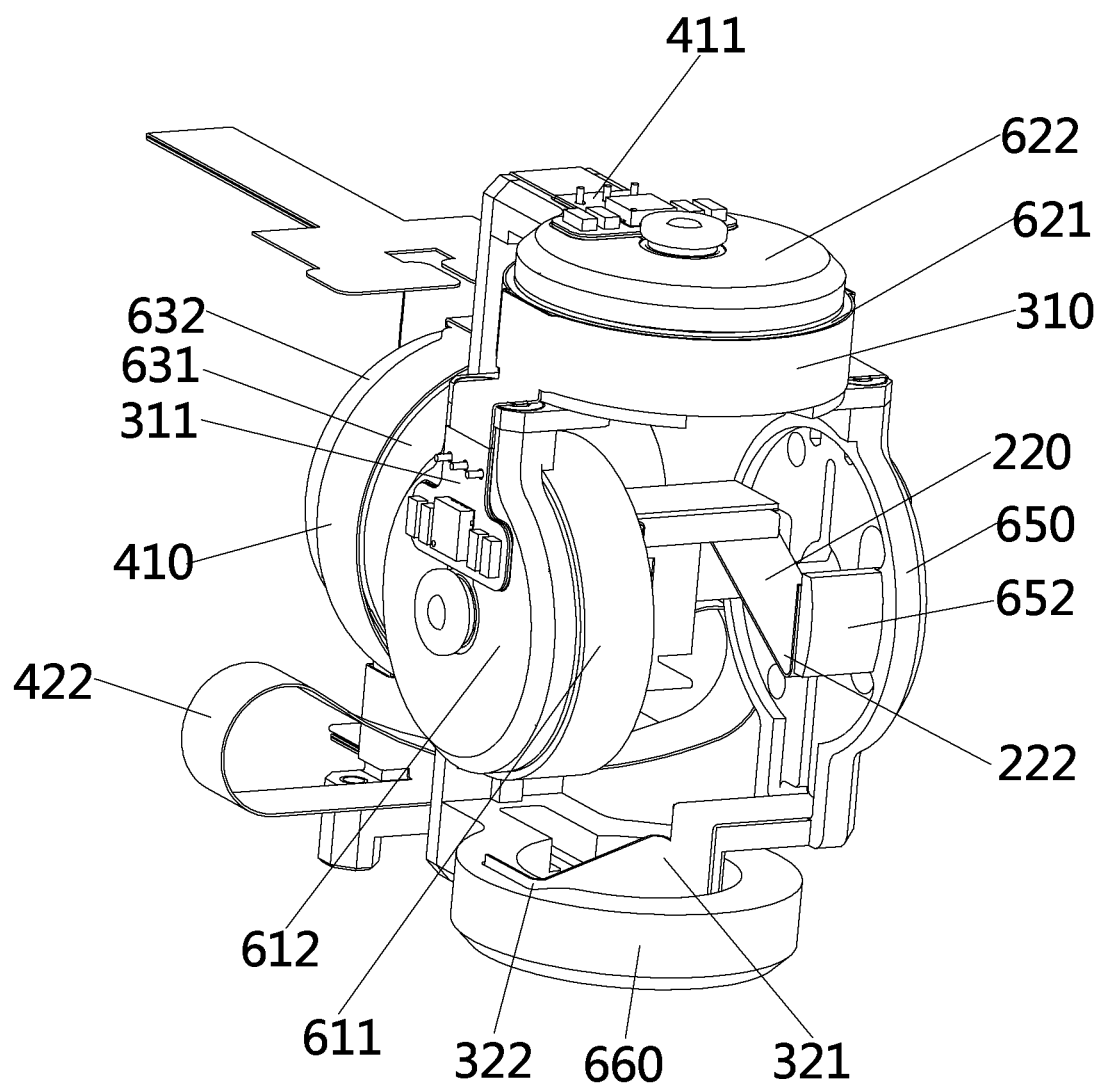
FIG. 15 is a schematic diagram illustrating a structure obtained after the multilayer FPC is wound on the gimbal provided by the fourth embodiment of the present disclosure.

With reference to FIG. 11 and FIG. 12, the first winding structure 200 is formed by winding the multiplayer FPC 100 on e.g. the electronic component. For example, the electronic components can be packaged on the multilayer FPC 100 in advance, and the first winding structure can be formed by winding the multilayer FPC 100, on which electronic components may be packaged, on the first driver in advance. Of course, the multilayer FPC 100 may also be directly wound on the first driver. The first winding structure 200 includes a first connection unit 210 and at least one first force offsetting unit 220, the first connection unit 210 is connected with the first force offsetting unit 220, and the first connection unit 210 is provided with the electronic components that are packaged thereon in advance.

With reference to FIG. 9 to FIG. 12, the second winding structure 300 is connected with the first winding structure 200, the second winding structure 300 is formed by winding the multilayer FPC 100 on the second driver, and the second winding structure 300 includes a second connection unit 310 and at least one second force offsetting unit 320. The second connection unit 310 and the second force offsetting unit 320 are connected. The second connection unit 310 is wound on the second driver.

As illustrated in the drawings, the first cable passage structure 650 is connected with the second driver, the second winding structure 300 further includes a first transition part 330, and the first transition part 330 is fixed to one side of the first cable passage structure 650. In this case, the second force offsetting unit 320 is connected with the second connection unit 310 through the first transition part 330. Furthermore, for example, the first transition part 330 is connected with the first force offsetting unit 220 so that the second winding structure 300 is connected with the first winding structure 200.

With reference to FIG. 9 to FIG. 12, the third winding structure 400 is connected with the second winding structure 300, the third winding structure 400 is formed by winding the multilayer FPC 100 on the third driver, and the third winding structure 400 includes a third connection unit 410, a second transition part 430 and at least one third force offsetting unit 420. The third connection unit 410 is wound on the third driver. The third connection unit 410 is connected with the second force offsetting unit 320 through the second transition part 430. The second transition part 430 is fixed to the second cable passage structure 660 so that the second force offsetting unit 320 is connected to the second cable passage structure 660. In this example, the first cable passage structure 650 is further rotatable with respect to the second cable passage structure 660, but the present embodiment is not limited thereto.

With reference to FIG. 11 and FIG. 12, when the first driver operates (e.g., rotates), the electronic component is brought into moving (e.g., rotating), so that the multilayer FPC 100 is moved following the electronic component. The first force offsetting unit 220 enables the internal force, which is generated at an inner side of sub-layers of the multilayer FPC 100 when the first winding structure 200 follows the movement of the electronic components, to be cancelled or alleviated, and reduces the resistance occurred upon pursuit movement.

With reference to FIG. 9 to FIG. 12, when the second driver operates (e.g., rotates), the first driver, the first cable passage structure and the electronic component are brought into moving (e.g., rotating) together, and the first cable passage structure 650 is rotated with respect to the second cable passage structure 660 so that the multilayer FPC 100 is moved following the second driver. The second force offsetting unit 320 enables the internal force, which is generated at an inner side of sub-layers of the multilayer FPC 100 when the second winding structure 300 follows the movement of the second driver, to be cancelled or alleviated, and reduces resistance upon pursuit movement.

With reference to FIG. 9 to FIG. 12, similarly, when the third driver operates (e.g., rotates), the second driver and the second cable passage structure 660 are brought into moving (e.g., rotating), and the first driver, the first cable passage structure 650 and the electronic components are in turn brought into moving (e.g., rotating) together, so that the multilayer FPC 100 is moved following the third driver. The third force offsetting unit 420 enables the internal force, which is generated at an inner side of sub-layers of the multilayer FPC 100 when the third winding structure 400 follows the movement of the third driver, to be cancelled or alleviated, and reduces resistance upon pursuit movement.

Thus, in the present embodiment, when the three drivers respectively operate, the internal force generated upon pursuit movement of the multilayer FPC 100 can be cancelled or alleviated by the respective at least one force offsetting unit, and thus the resistance upon pursuit movement can be reduced, and the overall movement precision can be improved.

For example, the method of winding a flexible cable according to the present embodiment can also be applied in e.g. a two-axis driven carrier device, in this example, the carrier device, for example, includes two drivers and one cable passage structure, and for the multilayer FPC provided for each of the drivers, at least one force offsetting unit can be provided to cancel or alleviate the internal force generated upon the pursuit movement of the multilayer FPC, thus the resistance upon pursuit movement can be reduced, and the overall movement precision can be improved.

Third Embodiment

Figure 8:
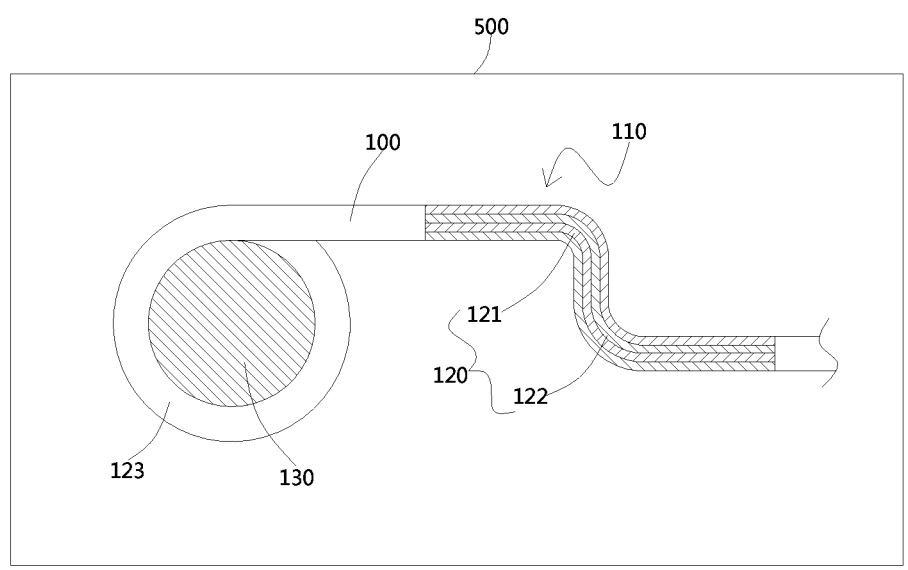
FIG. 8 is a schematic diagram illustrating structure of a carrying equipment provided by a third embodiment of the present disclosure.

With reference to FIG. 8, the present embodiment provides a carrying equipment 500, the carrying equipment 500 includes a carrier device 130 and a multilayer FPC 100 provided in layered stack. For example, the multilayer FPC 100 is formed as a cable in an elongated strip shape. The multilayer FPC 100 is wound on the carrier device 130 to form a winding structure 110, the winding structure 110 includes at least one force offsetting unit 120, the force offsetting unit 120 includes a first bending part 121 and a second bending part 122, and the first bending part 121 and the second bending part 122 are bent in opposite directions.

It should be appreciated that the carrying equipment 500 can be a product for carrying the carrier device 130, and with the multilayer FPC 100 wound on the carrier device 130, electrical connection between components can be achieved. The carrying equipment 500 can be applied in fields of aircraft, boat, motorized vehicle, aero-craft, and so on, and can be an image stabilization equipment, for example, applied in a gimbal on an unmanned aerial vehicle.

In this carrying equipment 500, by means of the force offsetting unit 120, the internal force generated at the inner side of the bent multilayer FPC 100 can be cancelled or alleviated with respect to each other, the resistance upon the pursuit movement of the multilayer FPC 100 can be reduced, and thus the stability of the carrier device 130 is strengthened and the movement precision of the carrier device 130 is improved.

Fourth Embodiment

With reference to FIG. 3 and FIG. 9 to FIG. 15, the present embodiment provides a gimbal 600 including a pitch motor 610, a yaw motor 620, a roll motor 630, a first cable passage structure 650, a second cable passage structure 660, a camera module 640, and a multilayer FPC 100 provided in layered stack. An axis of the pitch motor 610 (see the X-axis in FIG. 9), an axis of the roll motor 630 (see the-Y axis in FIG. 9) and an axis of the yaw motor 620 (see the Z-axis in FIG. 9) are orthogonal to each other. The multilayer FPC 100 is wound on the pitch motor 610, the yaw motor 620, and the roll motor 630, to form at least one winding structure 110, the winding structure 110 includes at least one force offsetting unit 120, the force offsetting unit 120 includes a first bending part 121 and a second bending part 122, and the first bending part 121 and the second bending part 122 are bent in opposite directions. These motors for example can be a DC servo motor, an AC servo motor, a step motor, a frequency conversion motor, a DC brushless motor, or the like.

Figure 9:
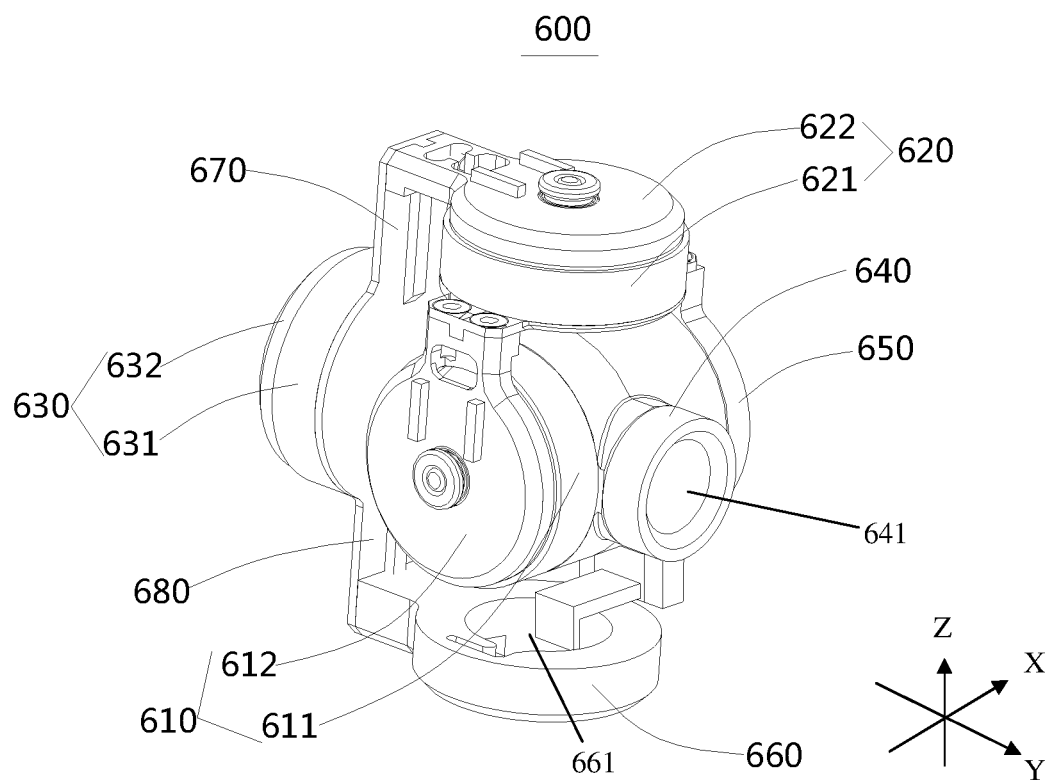
FIG. 9 is a schematic diagram illustrating a structure of a gimbal provided by a fourth embodiment of the present disclosure when being not wound.
Figure 10:
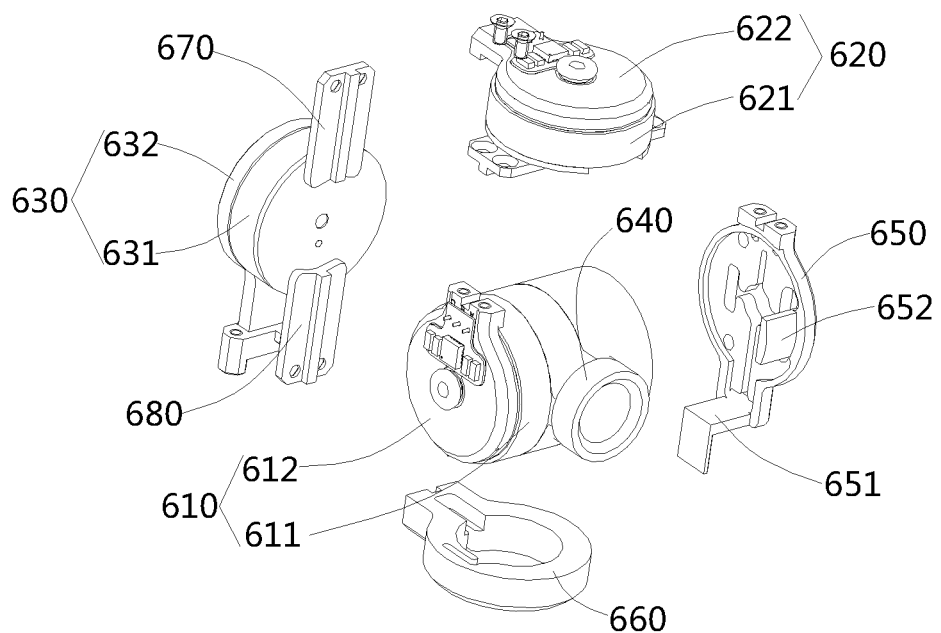
FIG. 10 is a exploded schematic diagram illustrating the structure in the case where the gimbal provided by the fourth embodiment of the present disclosure is not wound.

With reference to FIG. 9 and FIG. 10, the pitch motor 610 includes a pitch rotor housing 611 and a pitch stator 612, the pitch rotor housing 611 is rotatable with respect to the pitch stator 612. Similarly, the yaw motor 620 includes a yaw rotor housing 621 and a yaw stator 622, and the yaw rotor housing 621 is rotatable with respect to the yaw stator 622. The roll motor 630 includes a roll rotor housing 631 and a roll stator 632, and the roll rotor housing 631 is rotatable with respect to the roll stator 632.

The yaw stator 622 is connected with the roll rotor housing 631 through a first connection arm 670, and the second cable passage structure 660 is connected with the roll rotor housing 631 through a second connection arm 680. The yaw motor 620 is located opposite to the second cable passage structure 660, and they are respectively provided at opposite sides of the roll motor 630. For example, it is preferred that the first connection arm 670 and the second connection arm 680 are located in a same straight line. Also, for example, it is preferred that the second cable passage structure 660 is in a circular disk shape, and a receiving cavity 661 is provided therein.

The pitch motor 610 and the camera module 640 are located between the yaw motor 620 and the second cable passage structure 660. The pitch stator 612 of the pitch motor 610 for example is connected with a lower side of the yaw rotor housing 621. The pitch rotor housing 611 is connected with an end of the camera module 640 so that they can be rotated together. The first cable passage structure 650 is provided at a side of the camera module 640 away from the pitch rotor housing 611. For example, it is preferred that the first cable passage structure 650 is in a circular disk shape, for example, its upper end is connected with a lower side of the yaw rotor housing 621. At the lower side of the first cable passage structure 650, a rotation arm is provided, and compared with the case that no rotation arm is provided there, the rotation arm serves for guiding the yaw motor 620 in movement and thus provides improved stability. The rotation arm 651 is in an L-shape, one end of which is connected with the first cable passage structure 650, and the other end of which is extended into the receiving cavity 661 of the second cable passage structure 660. For example, a catch (or fixture block) 652 is provided at a side of the first cable passage structure 650 close to the camera module 640, and compared with the case that no catch is provided, the catch 652 serves for guiding the pitch motor 610 in movement, and thus provides improved stability. The camera module 640 may cover the catch 652 from the outer side and is rotatable with respect to the first cable passage structure 650.

With reference to FIG. 9 and FIG. 10, when the pitch motor 610 operates, the pitch rotor housing 611 is rotated with respect to the pitch stator 612, the pitch rotor housing 611 brings the camera module 640 into pitching rotation around the axis of the pitch motor 610, and thus the lens 641 of the camera module 640 can be positioned at different pitch angles in the Z-axis direction in drawings. When the camera module 640 is rotated by the pitch motor 610, an end of the camera module 640 close to the first cable passage structure 650 is rotated with respect to the first cable passage structure 650, while the first cable passage structure 650 is relatively kept at stationary with respect to the pitch motor 610, although the pitch motor 610 and the first cable passage structure 650 can both be rotated simultaneously by the yaw motor 620, as described below.

When the yaw motor 620 operates, the yaw rotor housing 612 is rotated with respect to the yaw stator 622, the yaw rotor housing 621 brings the pitch motor 610 and the first cable passage structure 650 that are connected with the yaw rotor housing 621 into rotating around the axis of the yaw motor 620 simultaneously in the same direction, and hence the camera module 640 is rotated around the axis of the yaw motor 620 along with the pitch motor 610. In addition, the rotation arm 651 of the first cable passage structure 650 is rotated in the receiving cavity 661 of the second cable passage structure 660.

When the roll motor 630 operates, the roll rotor housing 631 is rotated with respect to the roll stator 632, and the roll rotor housing 631 brings the first connection arm 670 and the second connection arm 680 that are connected with the roll rotor housing 631 into rotating in the same direction, that is, simultaneously rotating clockwise or anticlockwise, and therefore brings the yaw motor 620 and the second cable passage structure 650 into rotating around the axis of the roll motor 630 in the same direction accordingly, and in turn brings the pitch motor 610 and the camera module 640 into rotating around the axis of the roll motor 630 in the same direction accordingly.

Hereinafter, a case in which the multilayer FPC 100 is wound on such a gimbal 600 is described.

With reference to FIG. 3, FIG. 9 to FIG. 11, the multilayer FPC 100 is wound on the pitch motor 610, the yaw motor 620 and the roll motor 630 respectively to form three winding structures, that is, the first winding structure 200, the second winding structure 300 and the third winding structure 400. Each of the winding structures includes at least one force offsetting unit 120. For the purpose of convenient and definite description, in the present embodiment, each of the winding structures only has one force offsetting unit 120, but the present embodiment is not limited thereto. Each force offsetting unit 120 includes a first bending part 121 and a second bending part 122, and the first bending part 121 and the second bending part 122 are bent in opposite directions.

With reference to FIG. 9, FIG. 11, FIG. 14 and FIG. 15, because the camera module 640 is connected with the pitch rotor housing 611, the multilayer FPC 100 is wound on the camera module 640 and forms the first winding structure 200. The first winding structure 200 includes a first connection unit 210, a first force offsetting unit 220, and a third transition part 230. The first force offsetting unit 220 includes a third bending part 221 and a fourth bending part 222 which are bent in opposite directions. The first connection unit 210 is electrically connected with the camera module 640 to transmit various control signals, data signals, and so on to the camera module 640. For example, the first connection unit 210 and the first force offsetting unit 220 are both wound inside the camera module 640.

For example, the first connection unit 210 includes a first connection end 211 and a first connection part 212 that are connected with each other, and the first connection part 212 is connected with the third bending part 221 through the third transition part 230. The camera module 640 for example includes a camera and an inertial measurement unit (IMU), the camera can be any kinds of camera, may use visible light, infrared light or the like to shoot an image, the camera may also include a lens 641, an imaging chip such as CMOS or CCD imaging chip, and so on. In this example, the IMU can be packaged on the first connection unit 210, and then surface-mounted on a back surface of the camera module 640 for sensing the posture of the camera module 640 and transmitting the posture information to a controller for controlling each of the motors to adjust the posture of the camera module 640. Herein, the first connection end 211 may be connected with the camera, and the first connection part 212 can be connected with the IMU. For example, the third bending part 221 and the fourth bending part 222 form a Z shape. The first winding structure may further include a second connection part 223, the fourth bending part 222 is connected to the second connection part 223, and the second connection part 223 is fixedly connected to an inner side of the catch 652 of the first cable passage structure 650 e.g. by adhesive. When the pitch motor 610 operates, the third bending part 221 can be rotated around the fourth bending part 222, further canceling or alleviating the inner force generated when the first winding structure 220 follows the rotation.

With reference to FIG. 9, FIG. 11 and FIG. 12, the multilayer FPC 100 is wound on the yaw motor 620 to form the second winding structure 300, and the second winding structure 300 is connected with the first winding structure 200. The second winding structure 300 includes a second connection unit 310, a second force offsetting unit 320 and a first transition part 330. The second connection unit 310 is wound on the yaw rotor housing 621. The second force offsetting unit 320 includes a fifth bending part 321 and a sixth bending part 322, and the fifth bending part 321 is connected with the second connection unit 310 through the first transition part 330. For example, the first transition part 330 is fixed at an outer side of the first cable passage structure 650.

With reference to FIG. 9, FIG. 11 to FIG. 14, the first transition part 330 includes a first connection branch 331 and a second connection branch 332. The second connection part 223 is connected with the first transition part 330 by passing through the first cable passage structure 650, and thus enables the second winding structure 300 to be connected with the first winding structure 200. For example, the second connection part 223 is connected between the first connection branch 331 and the second connection branch 332, and for example, is respectively connected with a lower end of the first connection branch 331 and an upper end of the second connection branch 332 at a same position. An upper end of the first connection branch 331 is connected with the second connection unit 310, and the second connection unit 310 for example surrounds the yaw rotor housing 621. The second connection unit 310 is provided with a second connection end 311 at a position opposite to the first connection branch 331, and the second connection end 311 is electrically connected with the pitch stator 612, for example for transmitting control signals, electric power, and so on to the pitch motor. A lower end of the second connection branch 332 runs inside the first cable passage structure 650, and is bonded onto the rotation arm 651 of the first cable passage structure 650 by e.g. adhesive. The lower end of the second connection branch 332 is connected with the fifth bending part 321.

With reference to FIG. 9, FIG. 11 and FIG. 12, the fifth bending part 321 and the sixth bending part 322 are provided in the receiving cavity of the second cable passage structure 660. The sixth bending part 322 is caught in a slot in the second cable passage structure 660. For example, the fifth bending part 321 and the sixth bending part 322 form a Z shape. When the yaw motor 620 operates, the first cable passage structure 650 is rotated around the axis of the yaw motor 620, and the position of the second cable passage structure 660 is relatively fixed, then the first cable passage structure 650 is rotated with respect to the second cable passage structure 660, and the fifth bending part 321 is rotatable around the sixth bending part 322, and can further cancel or alleviate the internal force generated when the second winding structure 300 follows the rotation.

With reference to FIG. 9, FIG. 11 and FIG. 12, the multilayer FPC 100 is wound on the roll motor 630 to form the third winding structure 400, and the third winding structure 400 is connected with the second winding structure 300. The third winding structure 400 includes a third connection unit 410, a third force offsetting unit 420 and a second transition part 430. For example, the third connection unit 410 preferably surrounds the roll rotor housing 631 and is connected to the second transition part 430. The third force offsetting unit 420 includes a seventh bending part 421 and a eighth bending part 422 bent in opposite directions, and is connected to the second transition part 430.

With reference to FIG. 9, FIG. 11, FIG. 12 and FIG. 14, the third connection unit 410 is connected with the sixth bending part 322 through the second transition part 430. The second transition part 430 is bonded to a bottom portion of the second winding structure 660 for example by adhesive, and the third connection unit 410 is fixedly bonded to the roll rotor housing 631 for example by adhesive. An end of the second transition part 430 away from the sixth bending part 32 is bent upwardly to be connected with a lower end of the third connection unit 410, the third connection unit 410 is provided with a third connection end 411 at the end of the third connection unit 410 opposite to the second transition part 430, and the third connection end 411 is connected with the yaw stator 622 for transmitting control signals, power, and so on to the yaw motor for example. An end of the third connection unit 410 is reeled out downwardly and then connected to the third force offsetting unit 420 including the seventh bending part 421 and the eighth bending part 422. For example, the seventh bending part 421 and the eighth bending part 422 form a butterfly shape. The eighth bending part 422 is bent upwardly again and form a fourth connection end 423, and the fourth connection end 423 is connected with the roll stator 632 for transmitting control signals, power, and so on to the roll motor for example.

In addition, with reference to FIG. 11 to FIG. 14, the multilayer FPC 100 further includes a first connection section 700 and a second connection section 800 that are respectively connected with the eighth bending part 422. The first connection section 700 includes a fifth connection end that is connected with a first PCB board (not illustrated in drawings) provided in a gimbal. The second connection section 800 includes a sixth connection end 810 that is connected with a second PCB board (not illustrated in drawings) provided in the gimbal. The first PCB board and the second PCB board may respectively include electronic components, such as controllers, memories, and so on.

With reference to FIG. 9 to FIG. 15, when the pitch motor 610 operates, the pitch rotor housing 611 is rotated, and correspondingly the camera module 640 is brought into rotating around the axis of the pitch motor 610, so that the multilayer FPC 100 follows the rotation of the pitch rotor housing 611. At this time, the first force offsetting unit 220 enables the internal force, which is generated at an inner side of sub-layers of the multilayer FPC 100 when the first winding structure 200 follows the rotation of the camera module 640, to be cancelled or alleviated with each other, and the resistance upon pursuit movement is reduced.

When the yaw motor 620 operates, the yaw rotor housing 621 is rotated, and accordingly brings the first winding structure 650, the pitch motor 610 and the camera module 640 together into rotating around the axis of the yaw motor 620, and the first cable passage structure 650 is rotated around the axis of the yaw motor 620 with respect to the second cable passage structure 660 as well, so that the multilayer FPC 100 is rotated following the yaw rotor housing 621. At this time, the second force offsetting unit 320 enables the internal force, which is generated at an inner side of sub-layers of the multilayer FPC 100 when the second winding structure 300 is rotated following the yaw rotor housing 621, to be cancelled or alleviated with each other, and the resistance upon pursuit movement is reduced.

Similarly, when the roll motor 630 is operated, the yaw motor 620 and the second cable passage structure 660 are brought into rotating around the axis of the roll motor 630, and the pitch motor 610, the first winding structure 650, the camera module 640 are brought into movement together as well, so that the multilayer FPC 100 is rotated together following the roll rotor housing 631. At this time, the third force offsetting unit 420 enables the internal force, which is generated at an inner side of sub-layers of the multilayer FPC 100 when the third winding structure 300 is rotated following the roll rotor housing 631, to be cancelled or alleviated with each other, and the resistance upon pursuit movement is reduced.

Thus, when the three motors operate, respectively, there always is at least one force offsetting unit to cancel or alleviate the internal force generated when the multilayer FPC 100 follows the movement, and thus the resistance of the following movement is reduced, and the overall movement precision is improved.

Therefore, in the gimbal 600 provided by the present embodiment, the multilayer FPC 100 will not be driven in a disorder winding manner during the gimbal 600 is rotated, the overall structure is well-arranged. Meantime, the internal force generated at the inner side of the bent multilayer FPC 100 can be cancelled or alleviated with each other, by which the driving precision of the gimbal 600 is improved, the resistance when the multilayer FPC 100 follows rotation is reduced, and the stability of the gimbal 600 is strengthened.

For example, the method of winding a flexible cable according to the present embodiment can also be applied in a gimbal including e.g. two motors (e.g. pitch motor and yaw motor) and a camera module. In this case, the multilayer FPC provided for each of the motors can comprise at least one force offsetting unit to cancel or alleviate the internal force generated upon pursuit movement of the multilayer FPC, thus the resistance of the pursuit movement is reduced, and the overall movement precision is improved.

The gimbal of the present embodiment can be fixedly provided on a post of road lamp, a wall of room, a roof of house, or the like, and also can be provided on mobile devices, such as an unmanned aerial vehicle, a boat, a mobilized vehicle, or the like.

In the embodiments of the present disclosure, the multilayer FPC is wound on a carrier device to form a winding structure and form at least one force offsetting unit comprising a first bending part and a second bending part bent in opposite directions, then when the carrier device is moved, the first bending part and the second bending part bent in opposite directions allows the internal force generated at the inner side of the bent multilayer FPC to be cancelled or alleviated with each other, and reduces the resistance when the multilayer FPC follows movement. The multilayer FPC can be kept in a natural state when the carrier device is move, thus the connection portion of the multilayer FPC with the carrier device is not subjected to an external force, and no additional torque is applied onto the carrier device, so that the stability of the carrier device becomes stronger, the movement precision of the carrier device is enhanced, and the multilayer FPC will not be wound in a disorder manner, and the overall structure become better arranged.

What has been described above is only the particular embodiments of the present disclosure, is not intended to limit the present disclosure, and many modifications and variations can be easily conceived by the person skilled in the art. All the modifications, equivalent substitutions and improvement made within the spirit and principle of the present disclosure should be covered by the protection scope of the present disclosure.

What is claimed is:

1. A method of winding a flexible cable for electrical connection of a carrier device, the flexible cable comprising a multilayer flexible cable, and the method comprising:
   winding the multilayer flexible cable provided in layered stack on the carrier device to form at least one winding structure,
   wherein the winding structure comprises at least one force offsetting unit, and the force offsetting unit comprises a first bending part and a second bending part which are bent in opposite directions.

2. The method according to claim 1, wherein the first bending part and the second bending part form a spiral reverse shape, an S shape, a Z shape or a butterfly shape.

3. The method according to claim 1, wherein the at least one winding structure comprises a connection unit wound on the carrier device, and the connection unit is connected with the first bending part of the winding structure.

4. The method according to claim 1, wherein the carrier device comprises a first driver, the multilayer flexible cable is wound on the first driver to form the at least one winding structure, the at least one winding structure comprises a first winding structure, the first winding structure comprises a first force offsetting unit and a first connection unit, the first connection unit is wound on the first driver, and the first connection unit is connected with the first force offsetting unit.

5. The method according to claim 4, wherein the carrier device further comprises an electronic component, the electronic component is provided on the multilayer flexible cable and connected with the first driver, the multilayer flexible cable on which the electronic component is provided is wound on the first driver to form the at least one winding structure.

6. The method according to claim 4, wherein the carrier device further comprises a second driver, the at least one winding structure further comprises a second winding structure formed by winding the multilayer flexible cable on the second driver, the second winding structure comprises a second connection unit and a second force offsetting unit, the second force offsetting unit is connected with the second connection unit, and the second connection unit is wound on the second driver.

7. The method according to claim 6, wherein the carrier device further comprises a first cable passage structure connected with the second driver, the second winding structure further comprises a first transition part, the second force offsetting unit and the second connection unit are connected to the first transition part, and the first transition part is fixed onto the first cable passage structure.

8. The method according to claim 7, wherein the carrier device further comprises a third driver, the at least one winding structure further comprises a third winding structure formed by winding the multilayer flexible cable on the third driver, the third winding structure is connected with the second winding structure, the third winding structure comprises a third connection unit and a third force offsetting unit, and the third connection unit is wound on the third driver.

9. The method according to claim 8, wherein the carrier device further comprises a second cable passage structure, the third winding structure further comprises a second transition part,
the second force offsetting unit, the third connection unit and the third force offsetting unit are connected with the second transition part, and the second transition part is fixed on the second cable passage structure.

10. The method according to claim 1, wherein an end of the multilayer flexible cable is wound on the carrier device, another end is connected to another carrier device, and the force offsetting unit is located between the carrier device and the another carrier device.

11. A carrying equipment, comprising a carrier device and a multilayer flexible cable provided in layered stack,
wherein the multilayer flexible cable is wound on the carrier device to provide at least one winding structure, the winding structure comprises at least one force offsetting unit, and the force offsetting unit comprises a first bending part and a second bending part which are bent in opposite directions.

12. A gimbal, comprising at least one motor and a multilayer flexible cable provided in layered stack,
wherein the multilayer flexible cable is wound on the at least one motor and forms at least one winding structure, the winding structure comprises at least one force offsetting unit, the at least one force offsetting unit comprises a first bending part and a second bending part which are bent in opposite directions.

13. The gimbal according to claim 12, further comprising a camera module, wherein the at least one motor comprises a first motor, the camera module is connected with the first motor and is configured to be driven by the first motor to rotate around an axis of the first motor, the at least one winding structure comprises a first winding structure formed by winding on the first motor, the first winding structure comprises at least one first force offsetting unit, and the first winding structure is electrically connected with the camera module.

14. The gimbal according to claim 13, wherein the at least one motor further comprises a second motor, and the second motor is capable of driving the first motor to rotate around an axis of the second motor, the at least one winding structure further comprises a second winding structure formed by winding the multilayer flexible cable on the second motor, and the second winding structure is connected with the first winding structure, the second winding structure comprises a second connection unit and at least one second force offsetting unit, the second force offsetting unit is connected with the second connection unit, and the second connection unit is electrically connected with the second motor.

15. The gimbal according to claim 14, wherein the at least one motor comprises a third motor, the third motor is capable of driving the second motor to rotate around an axis of the third motor, the at least one winding structure further comprises a third winding structure formed by winding the multilayer flexible cable on the third motor, the third winding structure is connected with the second winding structure, the third winding structure comprises a third connection unit and at least one third force offsetting unit, the third force offsetting unit is connected with the third connection unit, and the third connection unit is electrically connected with the third motor.

16. The gimbal according to claim 15, further comprising a first cable passage structure, wherein the first cable passage structure is connected with the second motor and is configured to be driven by the second motor to rotate around the axis of the second motor.

17. The gimbal according to claim 16, wherein the second winding structure further comprises a first transition part, the second force offsetting unit and the second connection unit are connected through the first transition part, and the first transition part is fixed onto the first cable passage structure.

18. The gimbal according to claim 16, further comprising a second cable passage structure, wherein the second cable passage structure is connected with the third motor and is configured to be driven by the third motor to rotate around the axis of the third motor.

19. The gimbal according to claim 18, wherein the third winding structure further comprises a second transition part,
the third connection unit, the third force offsetting unit, and the second force offsetting unit are connected through the second transition part, and the second transition part is fixed onto the second cable passage structure.

20. The gimbal according to claim 15, wherein an axis of the first motor, an axis of the second motor and an axis of the third motor are orthogonal to each other.

* * * * *